United States Patent
Tanner et al.

(10) Patent No.: US 10,110,539 B1
(45) Date of Patent: Oct. 23, 2018

(54) LIGHTWEIGHT RESPONSE TIME MESSAGING SYSTEM

(71) Applicant: Joshua Tanner, Seattle, WA (US)

(72) Inventors: Joshua Tanner, Seattle, WA (US); Rebar Gene Klein Nieme, Seattle, WA (US)

(*) Notice: Subject to any disclaimer, the term of this patent is extended or adjusted under 35 U.S.C. 154(b) by 0 days.

(21) Appl. No.: 15/844,119

(22) Filed: Dec. 15, 2017

(51) Int. Cl.
| | |
|---|---|
| *G06F 15/16* | (2006.01) |
| *H04M 11/00* | (2006.01) |
| *H04L 12/58* | (2006.01) |
| *H04W 68/00* | (2009.01) |
| *H04L 12/26* | (2006.01) |
| *H04M 1/725* | (2006.01) |

(52) U.S. Cl.
CPC .......... *H04L 51/24* (2013.01); *H04L 43/0864* (2013.01); *H04L 51/20* (2013.01); *H04W 68/005* (2013.01); *H04M 1/72552* (2013.01)

(58) Field of Classification Search
CPC ..... G06Q 10/107; H04L 12/585; H04L 12/58; H04L 12/581; H04L 12/5855; G06F 17/2247; G06F 17/2705; G06F 17/272; G06F 17/30864; G06F 17/3089; H04M 2215/32; H04M 15/00; H04M 2215/2026; H04M 17/00; H04W 4/24
USPC ......................................................... 709/206
See application file for complete search history.

(56) References Cited

U.S. PATENT DOCUMENTS

| | | | |
|---|---|---|---|
| 2006/0259496 A1* | 11/2006 | Hashimoto | ........ H04N 5/44582 |
| 2010/0138503 A1* | 6/2010 | Ishikawa | .............. G06Q 10/107 709/206 |

OTHER PUBLICATIONS

GitHub, https://github.com/Mindful/favor/blob/master/src/processor.cpp, Aug. 2014.

* cited by examiner

*Primary Examiner* — Mahran Abu Roumi
(74) *Attorney, Agent, or Firm* — FSP LLC

(57) ABSTRACT

A system comprising a first device, a second device, a converter, a correlator, a splitter, a minimum density calculator, a selector, a timing metric calculator, and a scheduler configure the first device and the second device with a notification control signal to display a notification after a determined period of time based on the message history of the first device and the second device utilizing conversation grouping.

5 Claims, 4 Drawing Sheets

LIGHTWEIGHT RESPONSE TIME MESSAGING SYSTEM

REFERENCE TO COMPUTER PROGRAM LISTING

A computer program listing appendix is included herewith. Sublistings in the computer program listing appendix are numbered and referred to herein by their numbers, e.g., Listing (i), Listing (ii), etc.

BACKGROUND

Conventional message grouping systems to identify distinct conversations are complex, resource heavy, and difficult to implement for useful purposes. Utilizing such a conventional system to compute conversation response time is, therefore, inefficient. A quick, lightweight system to determine conversational response times may increase the efficiency of such a system. Those conversational response times may then be utilized for useful purposes without the described inefficiencies.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
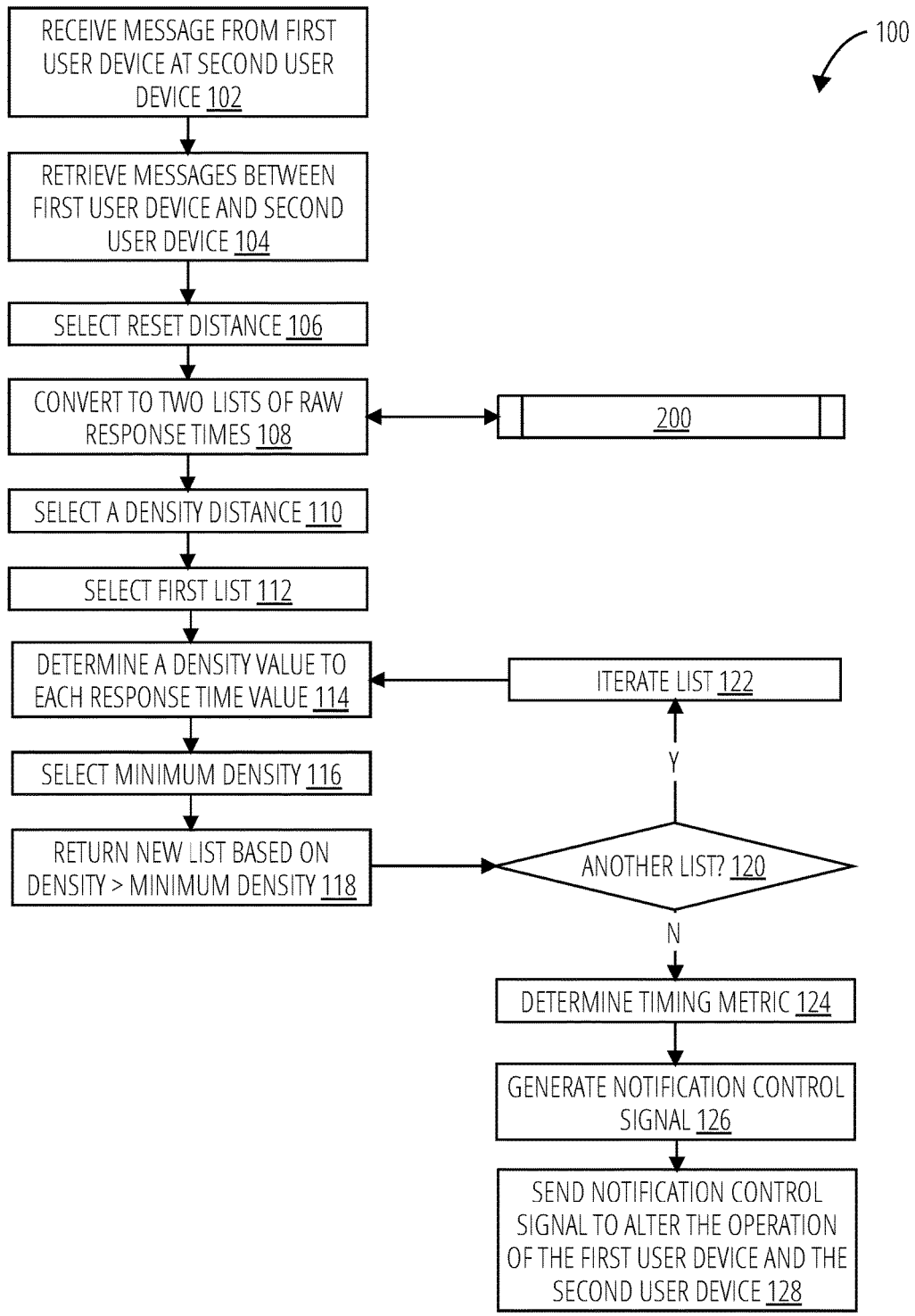
FIG. 1 illustrates an embodiment of a notification control signal generating method 100.

Referring to FIG. 1, a notification control signal generating method 100 receives a message from a first device at a second device (block 102). The notification control signal generating method 100 may also send a message from the first device to the second device. The one or more messages between the first device and the second device are retrieved (block 104). The one or more messages may be retrieved by and sent to a notification control generating system. A reset distance is selected (block 106). The reset distance may be selected in accordance with Listing (i). The one or more messages are converted to two lists of one or more raw response times (block 108). The raw response time conversion method 200 may be utilized to perform this process. The raw response times conversion may be performed in accordance with Listing (ii). A density distance is selected (block 110). The density distance may be selected in accordance with Listing (iii). A first list of the two lists of one or more raw response times is selected (block 112). A density value is determined for each response time value (block 114). In one embodiment, each response time value may be assigned a density value, which is equal to the number of other response time values that are within the density distance of the current response time. That is, a response time value has one density for every other response time value where the difference between the two response time values is less than or equal to the density distance, which is determined by the density distance value. The density value may be determined in accordance with Listing (iv). A minimum density is selected (block 116). The minimum density may be determined by a minimum density calculator. The list of one or more raw response times is converted to one or more vetted response times (block 118). The notification control signal generating method 100 then determines whether there is another list (decision block 120). If so, the notification control signal generating method 100 iterates to the next list (block 122). The notification control signal generating method 100 then proceeds with the new list from the block 114.

If there is not another list, a timing metric is determined (block 124). A timing metric may be determined for each list. The timing metric may be determined in accordance with Listing (v). A notification control signal is then generated from the timing metric (block 126). The notification control signal may be generated if another message is not sent or received between the first device and the second device within a period of time related to the timing metric determined. The period of time may be a multiple of the timing metric. The notification control signal may also be sent to the first device and the second device after generation (i.e., without the delay based on the timing metric). The notification control signal is sent to the first device and the second device to alter the operation of the first device and the second device (block 128). The notification control signal may alter the display of the first device and/or the second device. The notification control signal may alter each of the first device and the second device in a similar or different manner. The notification control signal may alter the first device and the second device to alter the operation to display in response to the notification control signal, or the notification control signal may operate the first device and the second device to determine whether the period of time associated with the notification control signal has elapsed after receiving the notification control signal prior to altering the display.

In some embodiments, the notification control signal further configures the first device and the second device to send the one or more messages associated with the first device and the second device to the converter. The notification control signal may configure the first device and the second device to operate an audible device associated with the first device and the second device. The timing metric may be an average of the one or more vetted response times, the notification control signal configuring the first device and the second device to alter the display after the average of the one or more vetted response times has elapsed from the receipt of the message by the second device. The first device, in response to sending the message to the second device, may send the one or more messages associated with the first device and the second device to the converter.

Figure 2:
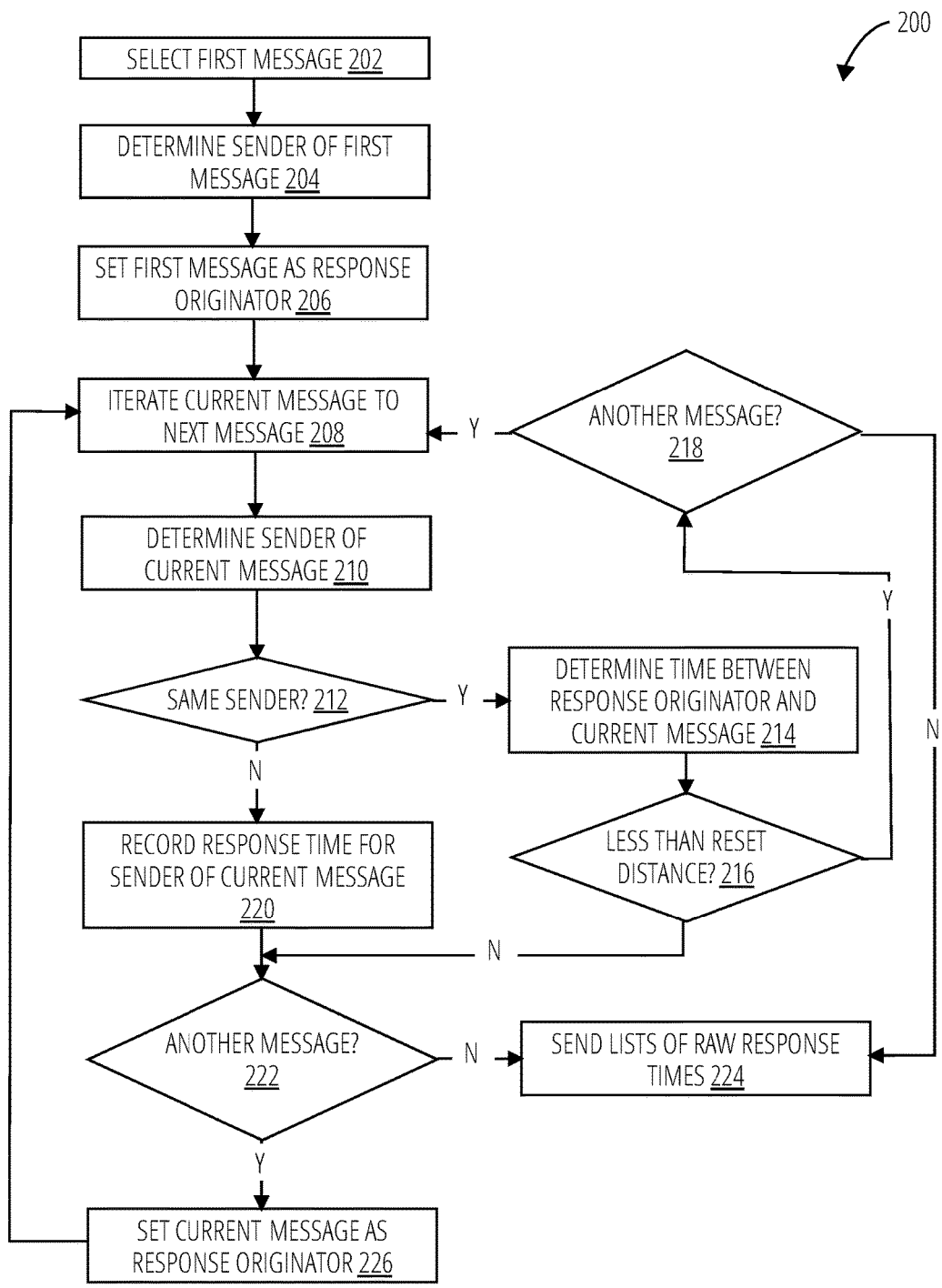
FIG. 2 illustrates an embodiment of a raw response time conversion method 200.

Referring to FIG. 2, a raw response time conversion method 200 selects a first message (block 202). The first message may be selected from the list of one or more messages. The one or more messages may be ordered based on a time stamp associated with each message. The sender of the first message is determined (block 204). The first message is set as the response originator (block 206). The raw response time conversion method 200 then iterates the current message to the next message (block 208). The sender of the current message is determined (block 210). The raw response time conversion method 200 determines whether the sender of the current message is the same as the sender of the response originator (decision block 212). If so, the time between the response originator and the current message is determined (block 214). The raw response time conversion method 200 determines whether the time between the response originator and the current message is less than the reset distance (decision block 216). If so, the raw response time conversion method 200 determines whether then is another message (decision block 218). If so, the raw response time conversion method 200 iterates to the current message to the next message (block 208). If difference between the response originator and the current message is not less than the reset distance (but the sender is the same), the raw response time conversion method 200 determines if there is another message (decision block 222) and if so, the current message is set as the response originator (block 226).

If the sender is not the same, the response time for the sender of the current message is recorded (block 220). The response time is the time between the response originator and the current message. Once recorded, the raw response time conversion method 200 then determines if there is another message (decision block 222). If not or if the decision block 218 determines that there is not another message, the list of one or more raw response times is sent to the notification control generating system or the correlator (block 224). If there is another message, the current message is set as the response originator (block 226). The current message is then iterated to the next message (block 208).

In other embodiments, the raw response time conversion method 200 determines response times "optimistically" by utilizing the last message as the response originator. This is done by updating next messages from the same sender to be the new response originator, instead of utilizing the reset distance. In such an embodiment, for a determination of the same sender in decision block 212, the raw response time conversion method 200 would proceed to the decision block 222. Additionally, the block 214, the decision block 216, and the decision block 218 would not be utilized in that embodiment.

Figure 3:
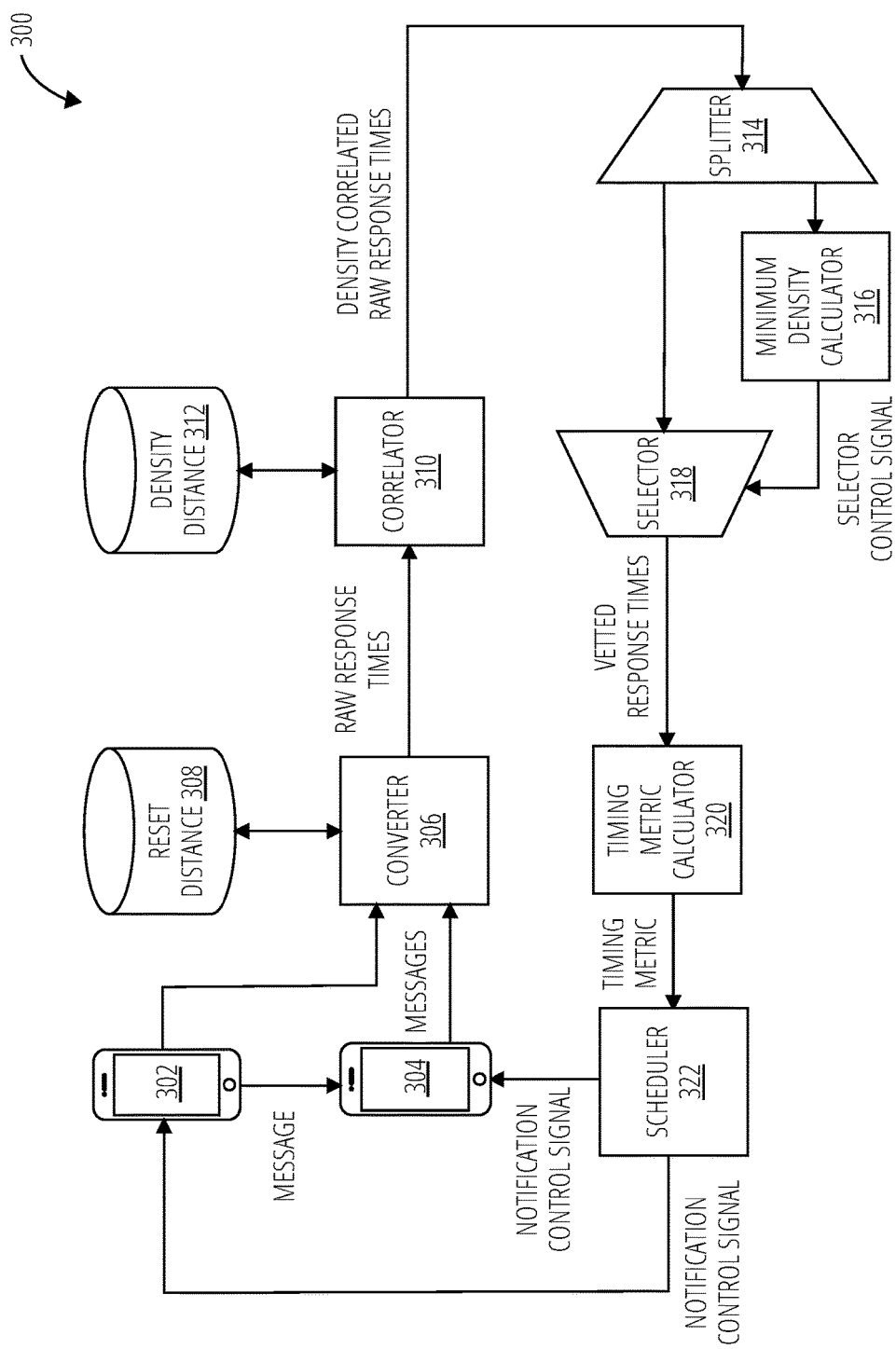
FIG. 3 illustrates an embodiment of a notification control generating system 300.

Referring to FIG. 3, a notification control generating system 300 comprises a first device 302, a second device 304, a converter 306, a reset distance control memory structure 308, a correlator 310, a density distance control memory structure 312, a splitter 314, a minimum density calculator 316, a selector 318, a timing metric calculator 320, and a scheduler 322.

The first device 302 may receive a notification control signal from the scheduler 322 and send a message to the second device 304. The notification control signal may alter the operation of the first device 302. The first device 302 may also send one or more messages to the converter 306, as well as receive a message from the second device 304. The one or more messages may be associated with the first device 302 and the second device 304. The first device 302 may display a notification or emit an audible notification.

The second device 304 receives a message from the first device 302 and receives a notification control signal from the scheduler 322. The second device 304 sends one or more messages to the converter 306. The one or more messages may be associated with the first device 302 and the second device 304. The notification control signal may alter the operation of the first device 302. The second device 304 may also send a message to the first device 302. The second device 304 may display a notification or emit an audible notification.

The converter 306 receives the one or more messages from the second device 304 or the first device 302. The one or more messages may have a time stamp and an indication of the sender of each of the one or more messages. The converter 306 sends a reset distance request signal to the reset distance control memory structure 308 and receives a reset distance control signal in response. This process may be performed in accordance with Listing (i). The converter 306 utilizes the reset distance control signal to convert the one or more messages to one or more raw response times. The one or more raw response times are sent to the correlator 310. This process may be performed in accordance with Listing (ii).

The reset distance control memory structure 308 stores one or more of the reset distance control signals. The reset distance control memory structure 308 sends a reset distance control signal to the converter 306 in response to a reset distance request signal.

The correlator 310 receives the one or more raw response times from the converter 306. The correlator 310 sends a density distance request signal to the density distance control memory structure 312 and receives a density distance control signal in response. This process may be performed in accordance with Listing (iii). The correlator 310 utilizes the density distance control signal to transform the one or more raw response times to one or more density correlated raw response times. Each response time value may be assigned a density value, which is equal to the number of other response time values that are within the density distance of the current response time. That is, a response time value has one density for every other response time value where the difference between the two response time values is less than or equal to the density distance, which is determined by the density distance control signal. This process may be performed in accordance with Listing (iv). The correlator 310 sends the one or more density correlated raw response times to the splitter 314.

The density distance control memory structure 312 stores one or more of the density distance control signals. The density distance control memory structure 312 sends a density distance control signal to the correlator 310 in response to a density distance request signal.

The splitter 314 receives the one or more density correlated raw response times. The splitter 314 then sends the one or more density correlated raw response times to the minimum density calculator 316 and the selector 318.

The minimum density calculator 316 receives the one or more density correlated raw response times from the splitter 314. The minimum density calculator 316 determines a minimum density. The minimum density calculator 316 may determine the standard deviation of the density values in the one or more density correlated raw response times. The minimum density calculator 316 may then apply a floor function to the one or more density correlated raw response times. The minimum density determined is sent as a selector control signal to the selector 318 to configure the selector 318.

The selector 318 receives the selector control signal from the minimum density calculator 316 and the one or more density correlated raw response times from the splitter 314. The selector 318 is configured by the selector control signal to select one or more of the one or more density correlated raw response times to be the one or more vetted response times. The one or more vetted response times may be the one or more density correlated raw response times that exceed the minimum density. The selector 318 sends the one or more vetted response times to the timing metric calculator 320.

The timing metric calculator 320 receives the one or more vetted response times from the selector 318. The timing metric calculator 320 transforms the one or more vetted response times to a timing metric. The timing metric may be the average of the values of the one or more vetted response times. This process may be performed in accordance with Listing (v). The timing metric is sent to the scheduler 322.

The scheduler 322 receives the timing metric from the timing metric calculator 320. The scheduler 322 generates a notification control signal for the first device 302 and the second device 304. The notification control signal may configure the first device 302 and the second device 304 to operate to display or emit a notification. The notification may be displayed or emitted after a period of time equal to the timing metric, or a multiple thereof. The scheduler 322 may be configured to apply a specific multiple to the timing metric. For example, the multiple may be 1.1, which may configure the first device 302 or the second device 304 to display or emit the notification after a period of 1.1×the timing metric. The time may be from the sending or the receiving of the message or the receipt of the notification control signal. In another embodiment, the scheduler 322 may determine whether the period of time has elapsed without receiving a new message or new timing metric, and send the notification control signal in response.

As the converter 306 may receive the one or more messages from both the first device 302 and the second device 304, the converter 306 may produce two lists of one or more raw response times: a first list from the one or more messages sent by the first device 302 and a second list from the one or more messages sent by the second device 304. The converter 306 may operate on one or both of the lists of the one or more messages. Each of these lists of one or more raw response times produced may be further transformed to the one or more density correlated raw response times, the one or more vetted response times, the timing metric, and the notification control signal. The notification control generating system 300 may determine to utilize one or both of the lists of one or more messages, and subsequent transformations of those one or more messages. The notification control generating system 300 may perform the determination based on resources to be allocated to perform the processing of the lists. The lists may also be processed in parallel or in series, and the notification control generating system 300 may determine the process to be utilized based on the resources to be allocated to perform the processing.

In some embodiments, the above components may be located on each of the first device 302 and the second device 304. Notification control signals may be then sent to other components of the first device 302 and the second device 304 that operate the display of the first device 302 and the second device 304. The scheduler 322 may include a timer or the first device 302 and the second device 304 may have a timer to determine whether the period of time has elapsed.

In another embodiment, the above components (other that first device 302 and the second device 304) may be located on a server or network. The server or network may send the notification control signal to the first device 302 or the second device 304 and may comprise a timer to determine whether the period of time has elapsed. The server or network may also send the notification control signal at the time of generation of the notification control signal, and the first device 302 and the second device 304 may determine whether the period of time has elapsed, and thus alter the display.

Furthermore, the above components may be located on each of the first device 302, the second device 304, and the server or network. The processes may then be performed on the device, server, or network based on a optimization of the allocation of resources of the devices, servers, and networks. The optimization may be based on the specific devices, servers, or networks to be utilized including processing speed, other operations being processed, and probability of communication between various components.

The notification control generating system 300 may be operated in accordance with FIG. 1 and FIG. 2.

Figure 4:
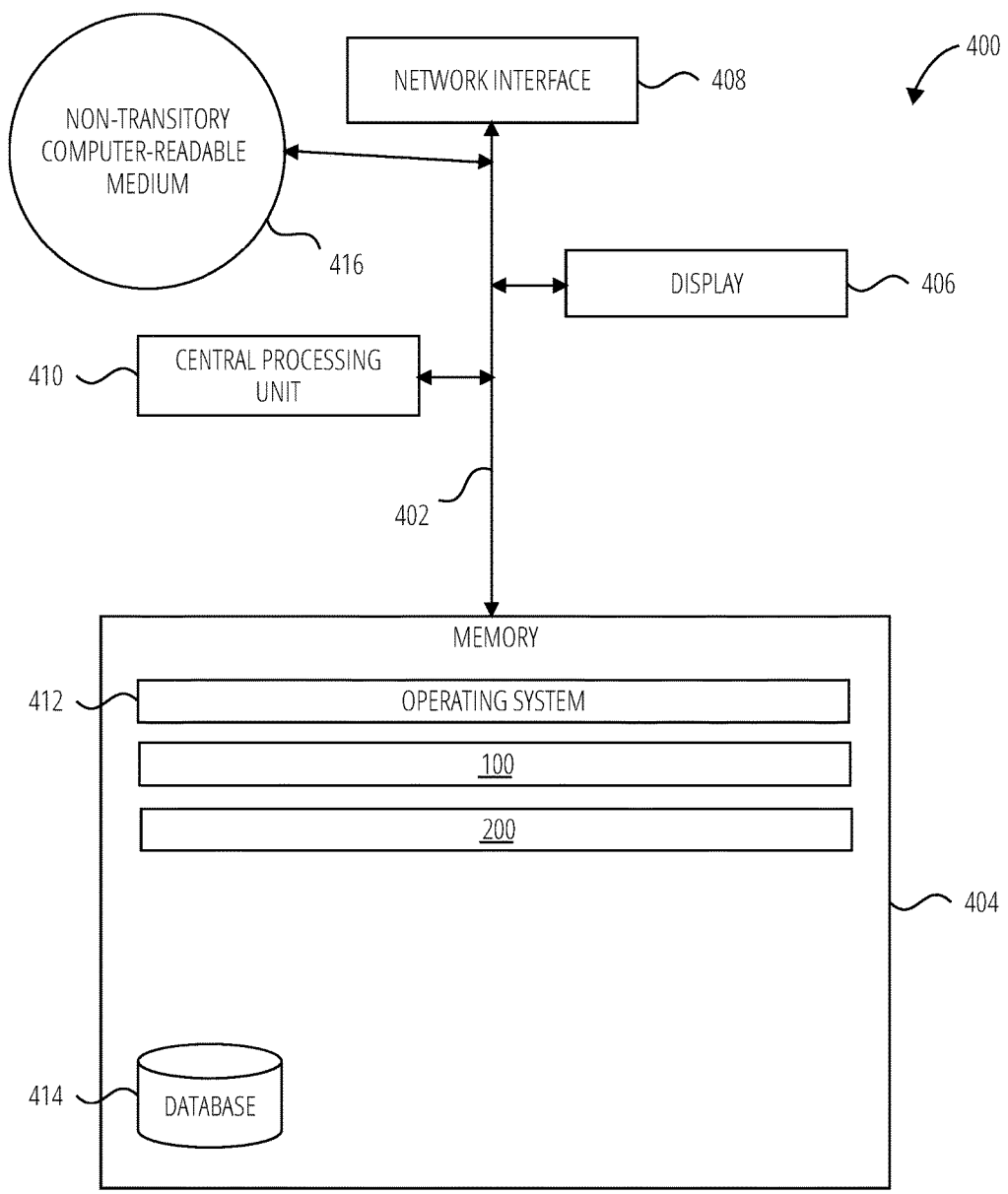
FIG. 4 illustrates a system 400 in accordance with one embodiment.

FIG. 4 illustrates several components of an exemplary system 400 in accordance with one embodiment. In various embodiments, system 400 may include a desktop PC, server, workstation, mobile phone, laptop, tablet, set-top box, appliance, or other computing device that is capable of performing operations such as those described herein. In some embodiments, system 400 may include many more components than those shown in FIG. 4. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 400 may comprise one or more physical and/or logical devices that collectively provide the functionalities described herein. In some embodiments, system 400 may comprise one or more replicated and/or distributed physical or logical devices.

In some embodiments, system 400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 400 includes a bus 402 interconnecting several components including a network interface 408, a display 406, a central processing unit 410, and a memory 404.

Memory 404 generally comprises a random access memory ("RAM") and permanent non-transitory mass storage device, such as a hard disk drive or solid-state drive. Memory 404 stores an operating system 412.

These and other software components may be loaded into memory 404 of system 400 using a drive mechanism (not shown) associated with a non-transitory computer-readable medium 416, such as a DVD/CD-ROM drive, memory card, network download, or the like.

Memory 404 also includes database 414. In some embodiments, system 400 may communicate with database 414 via network interface 408, a storage area network ("SAN"), a high-speed serial bus, and/or via the other suitable communication technology.

In some embodiments, database 414 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Audible device" in this context refers to the implementation of electronic circuit designs to perform conversions of sound/pressure wave signals to electrical signals, or vice versa.

"Average" in this context refers to a number expressing the central or typical value in a set of data, in particular the mode, median, or the mean, which is calculated by dividing the sum of the values in the set by their number.

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Clock" in this context refers to a circuit that generates a periodic signal, with a rate typically measured in cycles per second (measured in hertz, kilohertz, megahertz or gigahertz), to drive the operation of a synchronous circuit. A typical digital clock cycle toggles between a logical zero and a logical one state.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1> input2) output=val2; else output=val3; Many other examples of comparators will be evident to those of skill in the art, without undo experimentation.

"Controller" in this context refers to logic, collection of logic, or circuit that coordinates and controls the operation of one or more input/output devices and synchronizes the operation of such devices with the operation of the system as a whole. For example, the controller may operate as a component or a set of virtual storage processes that schedules or manages shared resources. For example, IF (controller.logic {device1|device2|device3} {get.data( ), process.data ( ), store.data ( )}), -device1 get.data(input1)→datainput1; -device2 process.data(data.input1)→formatted.data1→-device3 store.data(formatted.data1).

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0||safe_ condition|safe_lower_bound|safe_upper_bound||high_a- larm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Display" in this context refers to an electronic device for converting electronic signals to a visual presentation.

"Incrementer" in this context refers to logic to advance (increase or decrease) a counting or index value by a fixed or predictably variable amount. Examples of hardware incrementers include adder arithmetic circuits and counter circuits. An example of a software incrementer is: x=x+incrementValue. Incrementers may be used as counters, or as logic to advance a referencial or associative index in a memory data structure.

"Message" in this context refers to an electronic communication between two devices.

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Signal" in this context refers to one or more energy impulses that convey control commands, data, or attributes between machine elements or between people, or a combination of machines and people. Any physical entity exhibiting variation in time or variation in space is potentially a signal. Examples of signals include electrical impulses such as analog or binary electrical phenomenon, audio, video, speech, image, communication, geophysical, sonar, radar, and musical signals.

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output,(s) not select among inputs. Other examples of switches will be readily apparent to those having skill in the art, without undo experimentation.

"Timing metric" in this context refers to a control signal to configure a scheduler to generate a notification control signal.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

COMPUTER PROGRAM LISTING APPENDIX

```
Listing i:
    //Functions like floor( ), onesStandardDeviation( ), absoluteValue( ), max( ) etc.
are not defined as they correspond to well known mathematical concepts. The iterator
class, similarly, behaves like a standard
    //iterator. We can get the next thing it the sequence it is pointing to, get( )
returns the value/object it points to, and it is valid as long as it has not reached
the end of the sequence it is iterating.
    //Methods that deal with retrieving data from external data sources are also
left undefined as they're largely irrelevant to the algorithm.
    class Message {
        integer timestamp; //Time the message was sent or received, in UNIX time,
with ms granularity
        Person sender; //The sender of this message
        string body; //the message body
        integer id; //Unique message id
    }
    class ResponseTime {
        integer time; //the amount of time it took to respond, in ms
        integer density = 0; //the density of the response time, defaults to 0
    }
    //The main method that would be called by the device when a message was
sent/received. The only input is who we're talking to.
    void scheduleUserNotifications(Person conversationPartner){
        list<Message> messages = getMessagesToAndFrom(conversationPartner)
        list<ResponseTime> sentResponseTimes, receivedResponseTimes =
computeResponseTimes(messages)
        list<ResponseTime> denseSentResponseTimes =
filterResponseTimesByDensity(sentResponseTimes)
        list<ResponseTime> denseReceivedResponseTimes =
filterResponseTimesByDensity(receivedResponseTimes)
        integer averageSentResponseTime =
average(responseTimeValues(denseSentResponseTimes))
        integer averageReceivedResponseTime =
average(responseTimeValues(denseReceivedResponseTimes))
        integer responseTimeMultiplier = getResponseTimeThresholdMultiplier( )
        clearScheduledNotificationsForConversation(conversationPartner)
        //We don't actually use the received response time here because that's
arguably the other person's responsibility, but we certainly could
        scheduleNotificationForConversation(conversationPartner, currentTime( ) +
(averageSentResponseTime * responseTimeMultiplier))
    }
    pair<list<ResponseTime>, list<ResponseTime>> computeResponseTimes
(list<Message>
messages)
    {
        integer stripDistance = getStripDistance( )
```

-continued

Listing ii:
```
//Functions like floor( ), onesStandardDeviation( ), absoluteValue( ), max( ) etc.
are not defined as they correspond to well known mathematical concepts. The iterator
class, similarly, behaves like a standard
//iterator. We can get the next thing it the sequence it is pointing to, get( )
returns the value/object it points to, and it is valid as long as it has not reached
the end of the sequence it is iterating.
        //Methods that deal with retrieving data from external data sources are also
left undefined as they're largely irrelevant to the algorithm.
    class Message {
        integer timestamp; //Time the message was sent or received, in UNIX time,
with ms granularity
        Person sender; //The sender of this message
        string body; //the message body
        integer id; //Unique message id
    }
    class ResponseTime {
        integer time; //the amount of time it took to respond, in ms
        integer density = 0; //the density of the response time, defaults to 0
    }
    //The main method that would be called by the device when a message was
sent/received. The only input is who we're talking to.
    void scheduleUserNotifications(Person conversationPartner){
        list<Message> messages = getMessagesToAndFrom(conversationPartner)
        list<ResponseTime> sentResponseTimes, receivedResponseTimes =
computeResponseTimes(messages)
        list<ResponseTime> denseSentResponseTimes =
filterResponseTimesByDensity(sentResponseTimes)
        list<ResponseTime> denseReceivedResponseTimes =
filterResponseTimesByDensity(receivedResponseTimes)
        integer averageSentResponseTime =
average(responseTimeValues(denseSentResponseTimes))
        integer averageReceivedResponseTime =
average(responseTimeValues(denseReceivedResponseTimes))
        integer responseTimeMultiplier = getResponseTimeThresholdMultiplier( )
        clearScheduledNotificationsForConversation(conversationPartner)
        //We don't actually use the received response time here because that's
arguably the other person's responsibility, but we certainly could
        scheduleNotificationForConversation(conversationPartner, currentTime( ) +
(averageSentResponseTime * responseTimeMultiplier))
    }
    pair<list<ResponseTime>, list <ResponseTime>> computeResponse-
Times(list<Message> messages)
    {
        integer stripDistance = getStripDistance( )
        list<ResponseTime> resultsForSender = new list<ResponseTime>
        list<ResponseTime> resultsForRecipient = new list<ResponseTime>
        iterator<Message> responseOriginator = messages.head( )
        iterator<Message> currentMessage = responseOriginator
        while (currentMessage.isValid( )) {
            if (currentMessage == responseOriginator) {
                currentMessage = currentMessage.next( )
                continue //Nothing to be done on the first pass, so we skip
to the next run of the loop
            }
            if (currentMessage.get( ).sender ==
responseOriginator.get( ).sender) {
                if (currentMessage.get( ).timestamp -
responseOriginator.get( ).timestamp >= stripDistance) {
responseOriginator = currentMessage //There's too big
a gap, so we update the response originator. This is what we'd skip in an "optimistic"
computation
                }
            } else {
                //we know that the previous message's sender and the current
message's sender differ, so we know we need to record a response time
                //We know this comparing only to the response originator
(which may or may not be the previous message) because we will hit this condition on
the first message
                //after the response originator which does not have th same
sender as the response originator (meaning all previous messages, including the
immedaitely previous one, have the same sender)
                if (currentMessage.get( ).sender == SELF) {
resultsForSender.add(new
ResponseTime(currentMessage.get( ).timestamp - responseOriginator.get( ).timestamp))
                } else {
                    resultsForRecipient.add(new
```

```
ResponseTime(currentMessage.get( ).timestamp - responseOriginator.get( ).timestamp))
            }
        }
        currentMessage = curentMessage.next( )
    }
    return new pair<list<ResposnseTime>,
list<ResponseTime>>(resultsForSender, resultsForRecipient)
  }
  list<integer> responseTimeValues(list<ResponseTime> responseTimes){
      list<integer> responseTimeValues = new list<integer>
      responseTimeIterator = responseTimes.head( )
      while (responseTimeIterator.isValid( )) {
          responseTimeValues.add(responseTimeIterator.get( ).time)
          responseTimeIterator = responseTimeIterator.next( )
      }
      return responseTimeValues
}
Listing iii:
    //This is one way to compute minimum density although frankly this specific
computation can be adjusted by use case
        integer computeMinimumDensity(list<ResponseTime> responseTimes) {
            list<integer> responseTimeValues = responseTimeValues(responseTimes)
            return floor(oneStandardDeviation(responseTimeValues))
        }
        list<ResponseTime> filterResponseTimesByDensity(list<ResponseTime>
responseTimes) {
            integer densityDistance = getDensityDistance( )
            iterator<ResponseTime> outerIterator = responseTimes.head( )
            while (outerIterator.isValid( )) {
               iterator<ResponseTime> innerIterator = responseTimes.head( )
               while (innerIterator.isValid( )) {
                   if (outerIterator != innerIterator &&
absoluteValue(outerIterator.get( ).time - innerIterator.get( ).time) <= densityDistance)
{
                      outerIterator.get( ).density += 1
                   }
                   innerIterator = innerIterator.next( )
               }
               outerIterator =outerIterator.next( )
          }
Listing iv:
        integer ninimumDensity = computeMinimumDensity(responseTimes)
            list<ResponseTime> filteredResponseTimes = new list<ResponseTime>
            outerIterator = responseTimes.head( )
            while (outerIterator.isValid( )) {
              if (outerIterator.get( ).density >= minimumDensity) {
                  filteredResponseTimes.add(outerIterator.get( ))
              }
              outerIterator = outerIterator.next( )
            }
            return filteredResponseTimes
}
Listing v:
    //Functions like floor( ), onesStandardDeviation( ), absoluteValue( ), max( ) etc.
are not defined as they correspond to well known mathematical concepts. The iterator
class, similarly, behaves like a standard
    //iterator. We can get the next thing it the sequence it is pointing to, get( )
returns the value/object it points to, and it is valid as long as it has not reached
the end of the sequence it is iterating.
    //Methods that deal with retrieving data from external data sources are also
left undefined as they're largely irrelevant to the algorithm.
        class Message {
            integer timestamp; //Time the message was sent or received, in UNIX time,
with ms granularity
            Person sender; //The sender of this message
            string body; //the message body
            integer id; //Unique message id
        }
        class ResponseTime {
            integer time; //the amount of time it took to respond, in ms
            integer density = 0; //the density of the response time, defaults to 0
        }
        //The main method that would be called by the device when a message was
sent/received. The only input is who we're talking to.
           void scheduleUserNotifications(Person conversationPartner){
               list<Message> messages = getMessagesToAndFrom(conversationPartner)
               list<ResponseTime> sentResponseTimes, receivedResponseTimes =
computeResponseTimes(messages)
```

```
        list<ResponseTime> dens eSentResponseTimes =
filterResponseTimesByDensity(sentResponseTimes)
        list<ResponseTime> denseReceivedResponseTimes =
filterResponseTimesByDensity(receivedResponseTimes)
        integer averageSentResponseTime =
average(responseTimeValues(denseSentResponseTimes))
        integer averageReceivedResponseTime =
average(responseTimeValues(denseReceivedResponseTimes))
        integer responseTimeMultiplier = getResponseTimeThresholdMultiplier( )
        clearScheduledNotificationsForConversation(conversationPartner)
        //We don't actually use the received response time here because that's
arguably the other person's responsibility, but we certainly could
        scheduleNotificationForConversation(conversationPartner, currentTime( ) +
(averageSentResponseTime * responseTimeMultiplier))
}
```

What is claimed is:

1. A system comprising:
a first device to:
  send a message to a second device; and
  receive a notification control signal;
the second device to:
  receive the message from the first device;
  in response to receiving the message from the first device, send one or more messages associated with the first device and the second device to a converter; and
  receive the notification control signal;
the converter to:
  send a reset distance request signal to a reset distance control memory structure;
  receive a reset distance control signal from the reset distance control memory structure; and
  transform the one or more messages to one or more raw response times utilizing the reset distance control signal;
a correlator to:
  receive the one or more raw response times;
  in response to receiving the one or more raw response times, send a density distance request signal to a density distance control memory structure;
  receive a density distance control signal from the density distance control memory structure; and
  transform the one or more raw response times to one or more density correlated raw response times utilizing the density distance control signal;
a splitter to:
  send the one or more density correlated raw response times to a minimum density calculator and a selector;
the minimum density calculator to:
  transform the one or more density correlated raw response times into a selector control signal; and
  send the selector control signal to the selector to configure the selector;
the selector to:
  receive the one or more density correlated raw response times and the selector control signal; and
  in response to receiving the selector control signal, transform the one or more density correlated raw response times into one or more vetted response times;
a timing metric calculator to:
  transform the one or more vetted response times into a timing metric; and
  send the timing metric to a scheduler; and
the scheduler to:
  receive the timing metric;
  in response to receiving the timing metric, generate the notification control signal to configure the first device and the second device to alter a display associated with the first device and the second device after a period of time determined by the timing metric; and
  send the notification control signal to the first device and the second device.

2. The system of claim 1, wherein the notification control signal further configures the first device and the second device to send the one or more messages associated with the first device and the second device to the converter.

3. The system of claim 1, wherein the notification control signal configures the first device and the second device to operate an audible device associated with the first device and the second device.

4. The system of claim 1, wherein the timing metric is an average of the one or more vetted response times, the scheduler configuring the first device and the second device to alter the display after the average of the one or more vetted response times has elapsed from the second device receiving the message.

5. The system of claim 1, wherein the first device in response to sending the message to the second device, sends the one or more messages associated with the first device and the second device to the converter.

* * * * *